United States Patent [19]

Mayne et al.

[11] Patent Number: 4,829,370

[45] Date of Patent: May 9, 1989

[54] METHOD OF AND APPARATUS FOR INTERACTIVELY MODIFYING A HIGH-RESOLUTION IMAGE WHEREIN A LOW-RESOLUTION MODIFIED IMAGE IS REPEATEDLY DISPLAYED AT INCREASINGLY HIGHER RESOLUTIONS

[75] Inventors: Clive L. Mayne, London; Robert C. Wilson, Middlesex; Lindsay W. MacDonald, Bedfordshire, all of England

[73] Assignee: Crosfield Electronics, Ltd., London, England

[21] Appl. No.: 83,118

[22] Filed: Aug. 10, 1987

[30] Foreign Application Priority Data

Aug. 8, 1986 [GB] United Kingdom ................. 8619458

[51] Int. Cl.[4] ........................ H04N 1/46; H04N 1/40; H04N 5/262; H04N 9/74

[52] U.S. Cl. ........................................ 358/78; 358/22; 358/80; 358/183; 358/280

[58] Field of Search .................... 358/75, 75 IJ, 78, 80, 358/280, 22, 182, 183

[56] References Cited

U.S. PATENT DOCUMENTS

| | | | |
|---|---|---|---|
| 4,357,624 | 11/1982 | Greenberg | 358/80 |
| 4,488,245 | 12/1984 | Dalke et al. | 358/80 |
| 4,617,592 | 10/1986 | MacDonald | 358/78 |
| 4,641,185 | 2/1987 | Alston et al. | 358/75 |
| 4,675,725 | 6/1987 | Parkyn | 358/75 |
| 4,736,310 | 4/1988 | Colthorpe et al. | 358/75 |

FOREIGN PATENT DOCUMENTS

| | | | |
|---|---|---|---|
| 0142994 | 5/1985 | European Pat. Off. . | |
| 0178047 | 4/1986 | European Pat. Off. | 358/75 |
| 0185498 | 6/1986 | European Pat. Off. . | |
| 59-86980 | 5/1984 | Japan | 358/280 |

*Primary Examiner*—James J. Groody
*Assistant Examiner*—Randall S. Svihla
*Attorney, Agent, or Firm*—Sughrue, Mion, Zinn, Macpeak & Seas

[57] ABSTRACT

A method and apparatus for interactively modifying an image defined by original digital data, representing the color content of pixels of the image at a first resolution. The apparatus comprises a first store (4;12) for storing the digital data of the pixels at the first resolution; a monitor (9); a digitizing table (5); and an image processor (6;13,15). The image processor (6;13,15) is responsive to signals from the digitizing table (5) to select a modification algorithm and a portion of the image stored in the first store (4;12) to which the algorithm is to be applied. The image processor is further adapted to modify a subset of pixels of the image portion in accordance with the selected algorithm and to cause the modification image portion to be displayed on a monitor (9) at a second, lower resolution under the control of the modified pixels, and to modify and display successive subsets of the high resolution pixels while the same image portion and algorithm are selected and until all the high resolution pixels within the selected portion have been modified.

9 Claims, 4 Drawing Sheets

FRAME STORE 12      DISPLAY 9

STEP 1

| 11 | x | 13 | x |
|---|---|---|---|
| x | x | x | x |
| 31 | x | 33 | x |
| x | x | x | x |

| 11 | 13 |
|---|---|
| 31 | 33 |

STEP 2

| 11 | 12 | 13 | 14 |
|---|---|---|---|
| x | x | x | x |
| 31 | 32 | 33 | 34 |
| x | x | x | x |

| 11 | 12 | 13 | 14 |
|---|---|---|---|
| 31 | 32 | 33 | 34 |

STEP 3

| 11 | 12 | 13 | 14 |
|---|---|---|---|
| 21 | 22 | 23 | 24 |
| 31 | 32 | 33 | 34 |
| 41 | 42 | 43 | 44 |

| 11 | 12 | 13 | 14 |
|---|---|---|---|
| 21 | 22 | 23 | 24 |
| 31 | 32 | 33 | 34 |
| 41 | 42 | 43 | 44 |

METHOD OF AND APPARATUS FOR INTERACTIVELY MODIFYING A HIGH-RESOLUTION IMAGE WHEREIN A LOW-RESOLUTION MODIFIED IMAGE IS REPEATEDLY DISPLAYED AT INCREASINGLY HIGHER RESOLUTIONS

FIELD OF THE INVENTION

The invention relates to methods and apparatus for interactively modifying an image defined by original digital data, representing the colour content of pixels of the image.

DESCRIPTION OF THE PRIOR ART

In the field of colour printing it is now common for pixels of an image to be represented digitally and for that digital representation to be retouched and otherwise modified for example enlarged, contracted or rotated, by viewing a representation of the image on a monitor and then modifying the digital data until the desired final image is obtained. An example of equipment for retouching is our Studio 800 system.

In the conventional image display system of a graphic arts workstation, the image is displayed as an array of pixels on a high-resolution video monitor. Typically the display is organised as 1024 lines of 1024 pixels each, repeated at a rate of 60 frames per second to minimise flicker. The image is held as digital values in a frame store, with one or three components per pixels, depending upon whether the image is monochrome or coloured.

In the simplest arrangement, the pixels displayed on the screen bear a one-to-one relationship with the pixel values in the frame stroe. A video output controller simply reads the stored values in turn and passes them through a digital-to-analogue converter to the display monitor. It is also well known in the current art to apply scroll and zoom factors by means of the video output controller. Scroll modifies the addressing of the frame store by a pre-determined amount to achieve a relative displacement of the image on the screen. Zoom replicates successive pixels from the frame store to achieve an apparent enlargement of the image on the screen (for example, duplicating elements effectively doubles the image size). More complex video pixel processors allow the mixing of two or more images, as disclosed for example, in U.S. Pat. No. 4,617,592 entitled "Video Retouching System".

In graphic arts applications it is often necessary to modify part or all of the image to achieve certain transformations on effects. Such modifications generally fall into one of four broad categories: colour correction, spatial transforms, filters and blending operations. Colour correction includes both chromatic and achromatic changes to pixels, optionally restricted to certain defined colour domains. Spatial transforms include the positioning, resizing and rotation of images, as well as special effects such as perspective correction, skew and anamorphic stretching. Filters include image smoothing, sharpening and edge detection, as well as blemish removal and pixellation effects. Blending operations include all combinations of two or more images, such as region masking, soft merging and texture matting, as well as paint effects with electronic "brushes" of various shapes and colours.

The performance objective of any interactive image modification system is to allow the operator to achieve the desired modification to the displayed image without perceptible delay. Frequently the operator will be required to adjust a control device, generating a succession of modified images on the display screen until the desired degree of modification is achieved. (An example in the adjustment of angle for the rotation of an image). Delays of more than about 150 milliseconds between successive modifications of the displayed image will lead to a significant reduction in the cognitive efficiency of the operator.

In practice, for a video display system the shortest update time necessary is one video frame period, namely 16.7 milliseconds at a video refresh rate of 60 frames per second. The maximum update time of 150 milliseconds imposes severe speed requirements upon the processor which performs the modifications on the image in the frame store. In the worst case where all one million pixels in the frame store must be modified, an update rate of about 6 million pixels per second is needed. When the complexity of the modification algorithms is taken into account, the necessary processor performance becomes almost impossible to achieve at a realistic price with current technology.

SUMMARY OF THE INVENTION

In accordance with one aspect of the present invention, a method of interactively modifying an image defined by original digital data, representing the colour content of pixels of the image at a first resolution comprises (i) selecting a modification algorithm and a portion of the image to which the algorithm is to be applied;

(ii) modifying a first subset of pixels of the image portion in accordance with the selected algorithm;

(iii) displaying the modified image portion on a monitor at a second, lower resolution under the control of the modified pixels; and, (iv) repeating steps (ii) and (iii) on further subsets of the high resolution pixels while the same image portion and algorithm are selected and until all the high resolution pixels within the selected portion have been modified.

In accordance with a second aspect of the present invention apparatus for interactively modifying an image defined by original digital data, representing the colour content of pixels of the image at a first resolution comprises a first store for storing the original digital data; a monitor; operator adjustable control means; and image processing means responsive to signals from the operator adjustable control means to select a modification algorithm and a portion of the image stored in the first store to which the algorithm is to be applied, the image processing means being further adapted to modify a subset of pixels of the image portion in accordance with the selected algorithm and to cause the modified image portion to be displayed on the monitor at a second, lower resolution under the control of the modified pixels, and to modify and display further subsets of the high resolution pixels while the same image portion and algorithm are selected until all the high resolution pixels within the selected portion have been modified.

The present invention enables the desired performance objective of 150 msec update time to be met with the use of a relatively modest image processor by operating initially only on a sparese subset of the pixels in the frame store, refining the modification when time allows by interactive updating of the intermediate pixels. The invention trades off image detail against update time, making use of the results of recent psychophysiological research into the human visual system ("Discrimination of sharpness in a televised moving image", WE & KG Glenn, Displays, October 1985, pp. 202-6). The intention is that as the operator makes rapid interactive adjustments to the image, the displayed image will be modified quickly at a coarse resolution, as the adjustment rate drops, the image will be modified to a medium level of resolution, and when the adjustment ceases, the modification will be completed at a high display resolution for evaluation by the operator.

In some examples, after the first subset of pixels has been modified and displayed, all the remaining pixels in the image portion may be modified in a second processing step. In general, however, there will be a significant delay between the first modification and the completion of the second and thus it is preferable to modify smaller subsets of the pixels in turn and to display the resulting image portion after each modification under the control of all the previously modified pixels. As the modification process progresses, the displayed image portion will reflect the selected modification at higher and higher resolution.

Typically, the step of selecting a modification algorithm and an image portion will comprise viewing the image defined by the original digital data on the monitor. It is common practice to display an overlaid menu chart in a suitable area of the monitor screen. The operator can then use the control means, such as a digitising tablet and stylus, to point to the required menu item and to select the corresponding mode of operation. Similar techniques allow the operator to identify a region of interest within the displayed image.

Typically, step (ii), the modification of a subset of image pixels, is carried out within one frame period of the monitor although, with certain complex algorithms this may not be achievable.

In one example of the apparatus, the image processing means comprises a processor for reading selected subsets of data from the first store and for modifying the selected data in accordance with the selected algorithm; a second store defining the colour content of monitor pixels on a one-to-one basis, the second store being loaded with modified data by the processor; and a video controller for controlling the monitor in response to the data in the second store.

The advantage of this form of the image processing means is that a very simple video controller can be utilised which simply passes the data in the second store (typically through digital-to-analogue converters) directly to the monitor.

In the preferred arrangement, however, the image processing means comprises a processor for modifying the selected subsets of data in the first store; and a video controller for reading data for the modified pixels from the first store and for controlling the monitor in response to the read data.

The preferred arrangement makes use of a more complex video controller which has to be able to address the modified pixels in the first store, but avoids the need for two separate stores.

Preferably, each iteration of step (ii) is carried out while a partially modified image portion is being displayed on the monitor from the previous step (iii). Thus, in the case where successive subsets of the high resolution pixels are modified in turn, the operator, as he or she watches the monitor,will see the displayed image gradually "sharpen" to higher resolution as more and more pixels are processed.

The invention has the advantage that the operator can quickly assess the effect of the modification on the whole image and, if not satisfactory, try another control setting or modifying operation immediately (thus aborting the filling in of intermediate pixels). This technique greatly improves the interaction between operator and machine, by allowing him or her to work in an improved cognitive mode, and hence improves productivity.

Preferably, the pixels in each subset are regularly spaced throughout the image portion. For example, in the first modification step alternate pixels on alternate lines may be modified which leads to an increase in processing speeds by a factor of 4. In another arrangement, every fourth pixel of every fourth line of the high resolution image portion could be processed in the first modification step, leading to an increase in processing speed by a factor of 16.

BRIEF DESCRIPTION OF THE DRAWINGS

Two examples of methods and apparatus in accordance with the present invention will now be described with reference to the accompanying drawings in which.

DETAILED DESCRIPTION OF EMBODIMENTS

Figure 1:
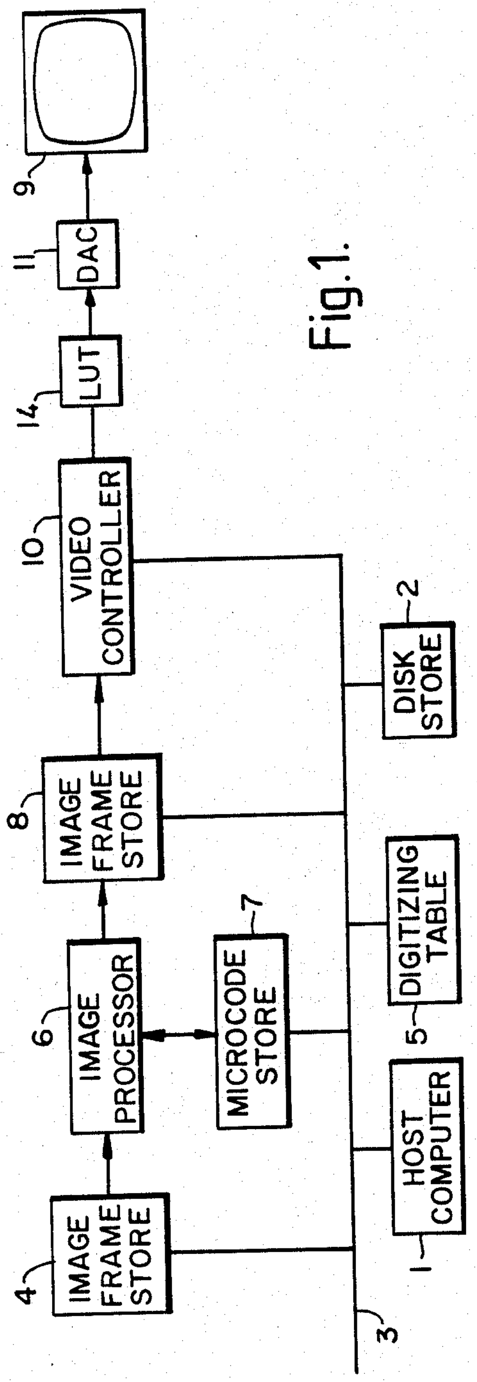
FIG. 1 is a block diagram of a first example.

The apparatus shown in FIG. 1 comprises a host computer 1, a disc store 2 which stores original digital data defining an image and which is coupled to the host computer 1 by a processor bus 3. The apparatus also comprises a first image frame store 4 into which a portion of the image stored in the disc store 2 is loaded under the control of an operator who sends commands to the host computer 1 by making ue of a conventional digitising table and cursor 5. Typically, the pixel data of the image in the disc store 2 will define printing colour components for each pixel, (for example cyan, magenta, yellow, and black).

An image processor 6 under microcode programme control from a microcode store 7 carries out the various modifications specified by the operator and loads modified data in the manner to be described below into a second image frame store 8. The store 8 defines the pixel content of each pixel of a monitor 9 to which it is connected via a video controller 10, look-up table 14, and a digital to analogue converter 11. The video controller 10 accesses the pixel data of the image frame store 8 at the frame rate of the monitor 9 (for example 60 times per second) to control the display on the monitor 9.

Since the signals needed to control the monitor 9 will typically represent different colour components (red, green, and blue) from the printing colour components, the image processor 6, in addition to its other functions, converts the printing colour components to corresponding monitor colour components in a conventional manner at the time of loading digital data into the image frame store 8. The method of the invention applies to images in any arbitrary colour space. The look-up table 14 can be used for calibration and gamma correction of the monitor 9. It may also be used for simple colour mapping, for example from an 8-bit monochrome image in the frame store 8 to 8-bit signals for each of the red, green and blue channels of a colour monitor.

In operation, the operator initially views the original image, unmodified, as stored in the image frame store 4, on the monitor 9. To achieve this, the content of the image frame store 4 is simply copied into the image frame store 8 and is then displayed. If the operator wishes to modify a portion of the image, he or she defines the portion using a digitising table and the host computer 1 responds to this definition by applying a mask to the image frame store 4. The operator also indicates to the host computer 1 the type of modification required. The image processor 6 then accesses the unmasked portion of the image in the frame store 4 by selecting a subset of the pixels within the selected portion, for example alternate pixels of alternate lines, and applies to each of these the algorithm selected by the operator. For each pixel within the selected image portion, as defined in the frame store 8, the image processor 6 determines whether that pixel corresponds to a pixel in the frame store 4 which has been modified and, if it does, loads the pixel in the frame store 8 with the modified data of the corresponding pixel. If it does not, the image processor 6 loads the pixel in the frame store 8 with modified data from the corresponding pixel in the frame store 4 which is closest to the pixel in question. After this initial pass, the image frame store 8 will define the selected image portion by groups of identical pixels (typically groups of 2×2 pixels) thus representing the modified image portion at a lower resolution. The video controller 10 responds as before to copy the content of the frame store 8 onto the monitor 9 which will thus display the image portion selected at low resolution and the remaining part of the image at the usual high resolution.

During this display, and prior to the next frame display, the image processor 6 will apply the same modification algorithm to a second subset of unmodified pixels read from the frame store 4 which ae then used in conjunction with the first subset to load the image frame store 8 in a similar manner. Once again, the video controller 10 responds to the content of the frame store 8 to display the image on the monitor 9. The image portion will have a slightly higher resolution then on the previous display.

While the selected modification and the selected portion remains the same, this process will continue until the entire image portion has been modified and is displayed at the highest resolution. At this stage, if the operator finds the modification satisfactory, he can indicate this to the host computer 1 causing the content of the image frame store 4 to be updated in accordance with the selected algorithm. It should be understood that until this stage has been reached, the data in the image frame srore 4 is unmodified.

If during the first pass or during a successive pass, the operator requests a different degree of modification thė current modification pass will be aborted and the process will recommence with the new information.

It should be noted that in this example, the image processor 6 is responsible for all functions such as scroll, zoom and pixel modification as well as the successive modification pass technique.

Figure 2:
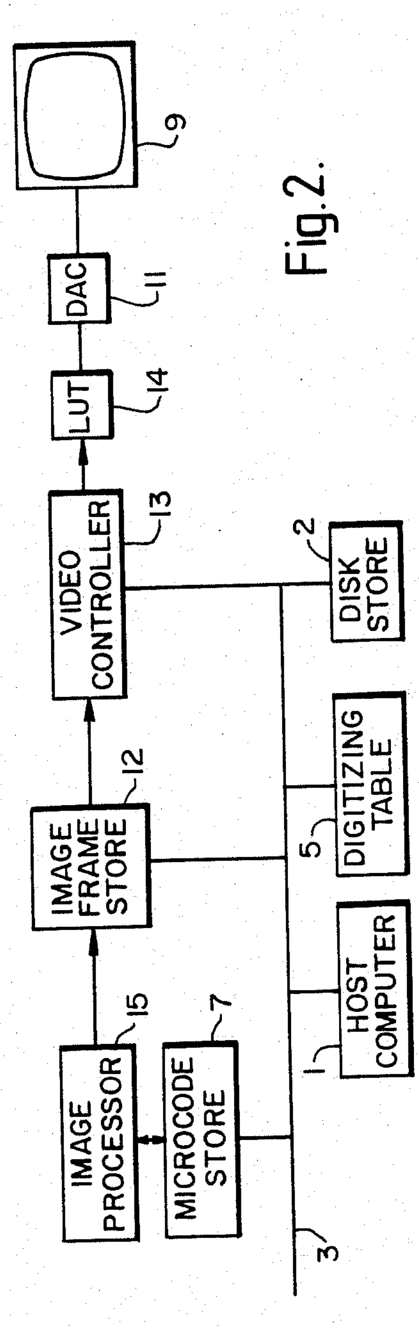
FIG. 2 is a block diagram of a second example.

FIG. 2 illustrates a second example which is similar to the FIG. 1 example with those components which are the same in each Figure having the same reference numerals. In this case, however, there is a single image frame store 12 coupled to a video controller 13 which is responsible not only for controlling the display on the monitor 9 but also for selecting pixel data from the frame store 12 and for applying scroll, zoom and the successive pass update function at synchronous video rates before passing the digital data through an output look-up table (LUT) 14 to the digital to analogue converter 11 and thence to the display monitor 9. It should be noted that in the case of a coloured image, the image frame store 12, video controller 13, LUT 14, and DAC 11 would be triplicated for the red, green, and blue colour components respectively. A similar triplication would be needed in the FIG. 1 example.

Figure 3:
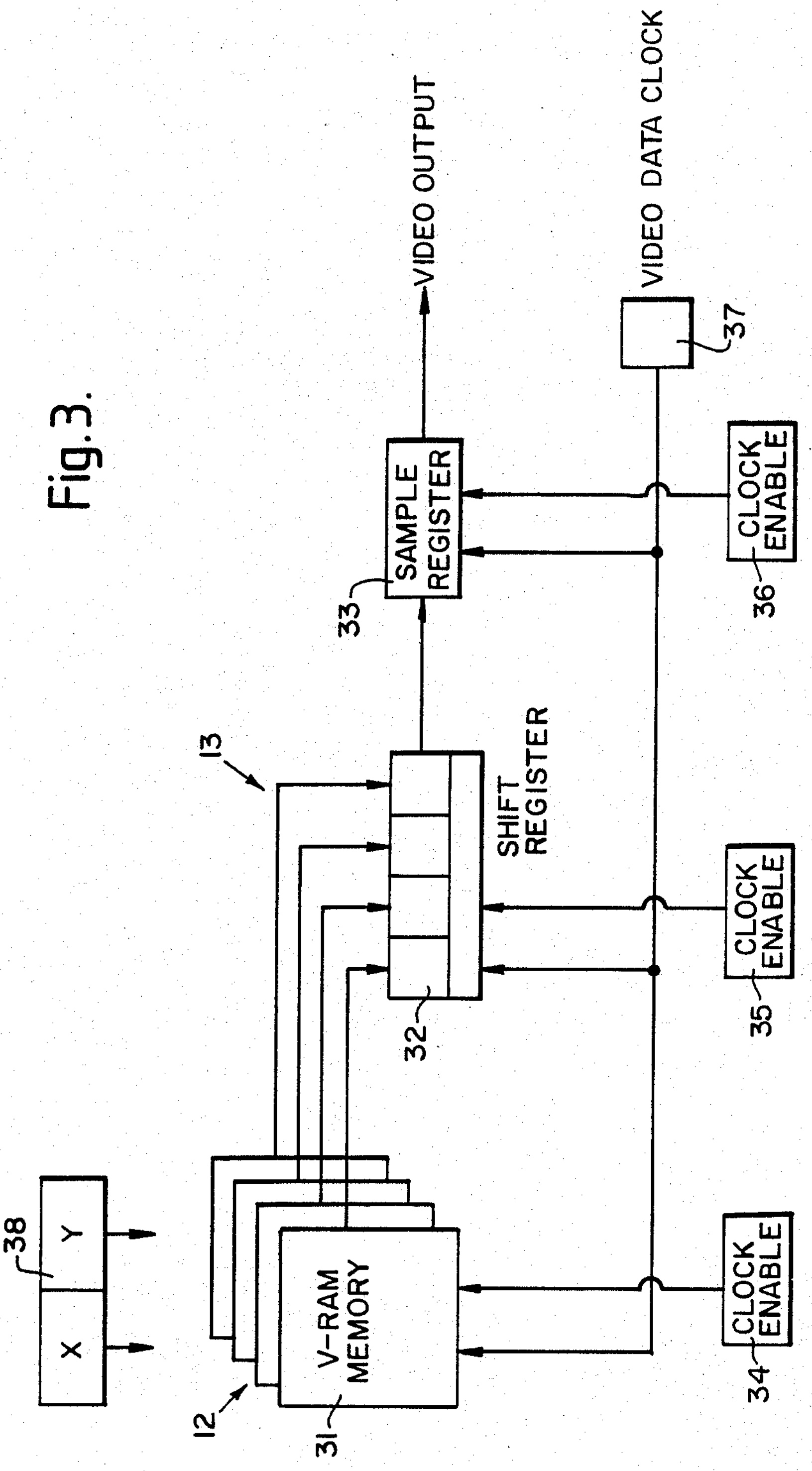
FIG. 3 is a block diagram of part of the apparatus shown in FIG. 2.

FIG. 3 illustrates pats of the FIG. 2 apparatus in more detail. The image frame store 12 comprises four banks of V-RAM memory 31, each of which is organised to provide 1024 lines of 256 pixels of 8 bits. At each memory read cycle four pixels are read from the V-RAM into a shift register 32 of the video controller 13, from which they are moved serially into a sample register 33 and thence to the video output path to the LUT 14. The video data clock 37 generates cycles at about 91 MHz, or 11 nanoseconds per pixel, in order to support the video display format of 60 non-interlaced frames per second. Separately controlled clock-enable gates 34, 35, 36 govern the rate at which the video clock is applied to the V-RAM memory 31, shift register 32 and sample register 33 respectively.

In normal operation, when the content of store 12 is to be displayed unmodified, the clock-enable gate 34 will be set to 1:4 ratio, so that the V-RAM memory 31 will be read every fourth video clock cycle, that is once every 44 nanoseconds. The four resulting pixels are stored in the shift register 32. Clock-enable gates 35 and 36 will both be set to 1:1 ratio, so that every clock cycle will cause both registers 32 and 33 to be enabled. Thus one pixel will be output from the shift register 32 through the sample register 33 to the display on each clock cycle.

When the operator requires to make a modification to a portion of th image, such a modification being of one of the four types mentioned in the introduction to the specification, he initially specifies the image portion and the type of modification in a similar way to that mentioned above by making use of the digitising table 5. The image processor 15 then responds to this command by modifying a selected sub-sample of the pixels defining the image at high resolution in the image frame store 12. For example, the image processor 15 could modify every Nth pixel in every Nth line of the image. In this case, the clock-enable gate 34 is set to the normal 1:4 ratio so that the V-RAM 31 delivers a four pixel group every fourth video clock cycle, and the clock-enable gate 35 is set to the normal 1:1 ratio, so that the shift register outputs one pixel every clock cycle. The clock-enable gate 36, however, is set to a 1:N ratio so that the sample register 33 accepts a new data only on every Nth video clock cycle, holding it constant in between. N is generally in the range 1 to 4 depending upon the subsample frequency. This provuides the necessary replication (or amplification) in the horizontal or X direction. The vertical or Y direction replication is achieved by controlling the Y addreses to the V-RAM 31 through the register 38 under the contrl of the host computer 1.

Figure 4:
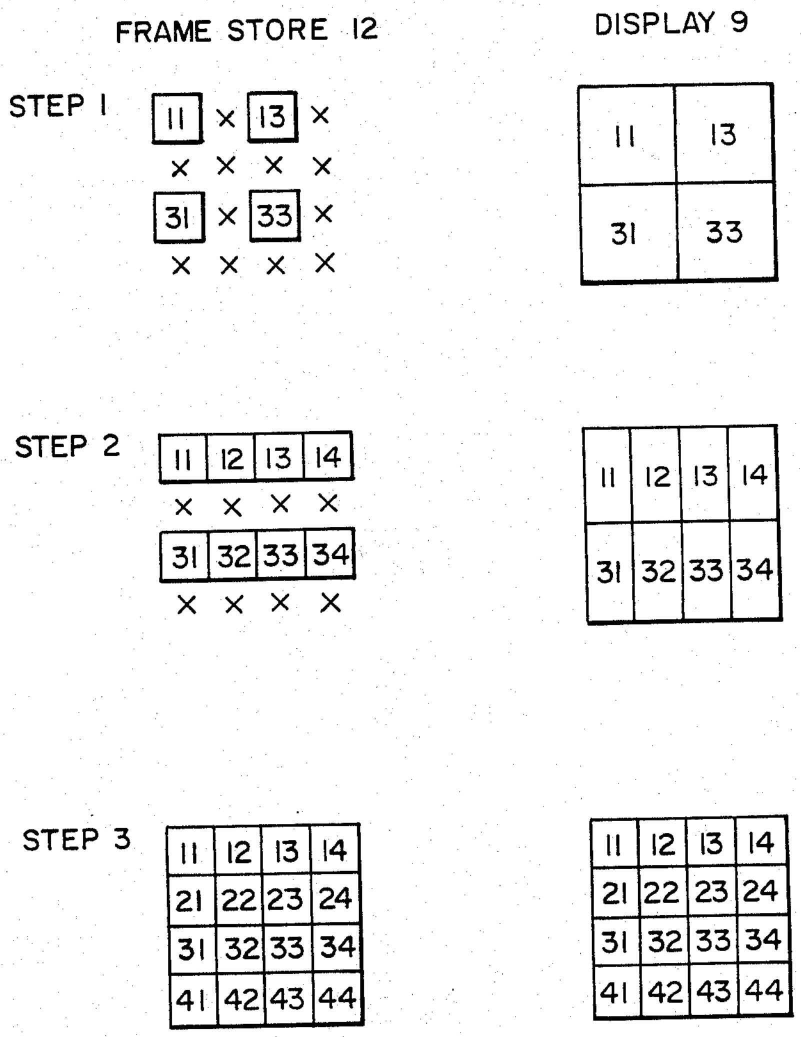
FIG. 4 illustrates how the contents of the frame store and display in the FIG. 2 example are updated in successive passes in one method according to the invention; and, FIG. 5 is similar to FIG. 4 but illustrating a second example of a method according to the invention.

FIG. 4 illustrates three successive passes or steps in one example of the method, where the sub-sample interval N=2. The left hand column in FIG. 4 illustrates the pixel data in a portion of the image frame store 12 which is to be modified, while the right hand column illustrates the corresponding portion of the display on the monitor 9. In this example, a block of 4×4 high resolution pixels is considered. Thus, in a first pass (step 1) the data in every alternate pixel of each alternate line is updated (pixels 11, 13, 31, 33 in FIG. 4). When this version of the modified image portion is displayed, it will result in the four pixels in the top left hand quadrant of the monitor display each being controlled in accordance with modified pixel 11, the pixels in the top right hand quadrant being controlled by the modified data in pixel 13 etc. Thus, the resolution of displayed image is a quarter the original resolution.

On the second pass, the "sample" and "hold" settings for the X direction are changed (N=1) to reflect the improved resolution since at this stage the image processor 15 has updated pixels 12, 14, 32, 34 during the previous display. The video controller 13 thus generates a higher resolution display (step 2). The Y direction setting is unchanged.

Finally, on a third pass, the remaining pixels in the image frame store 12 are modified by the image processor 15, and the Y direction setting is changed so that the video controller 13 causes the monitor 9 to display the full high resolution version of the image.

The modification sequence employed by the image processor 15 for each block of 2×2 pixels in this example is as follows:

| |
|---|
| 1 2 |
| 3 3 |

Figure 5:
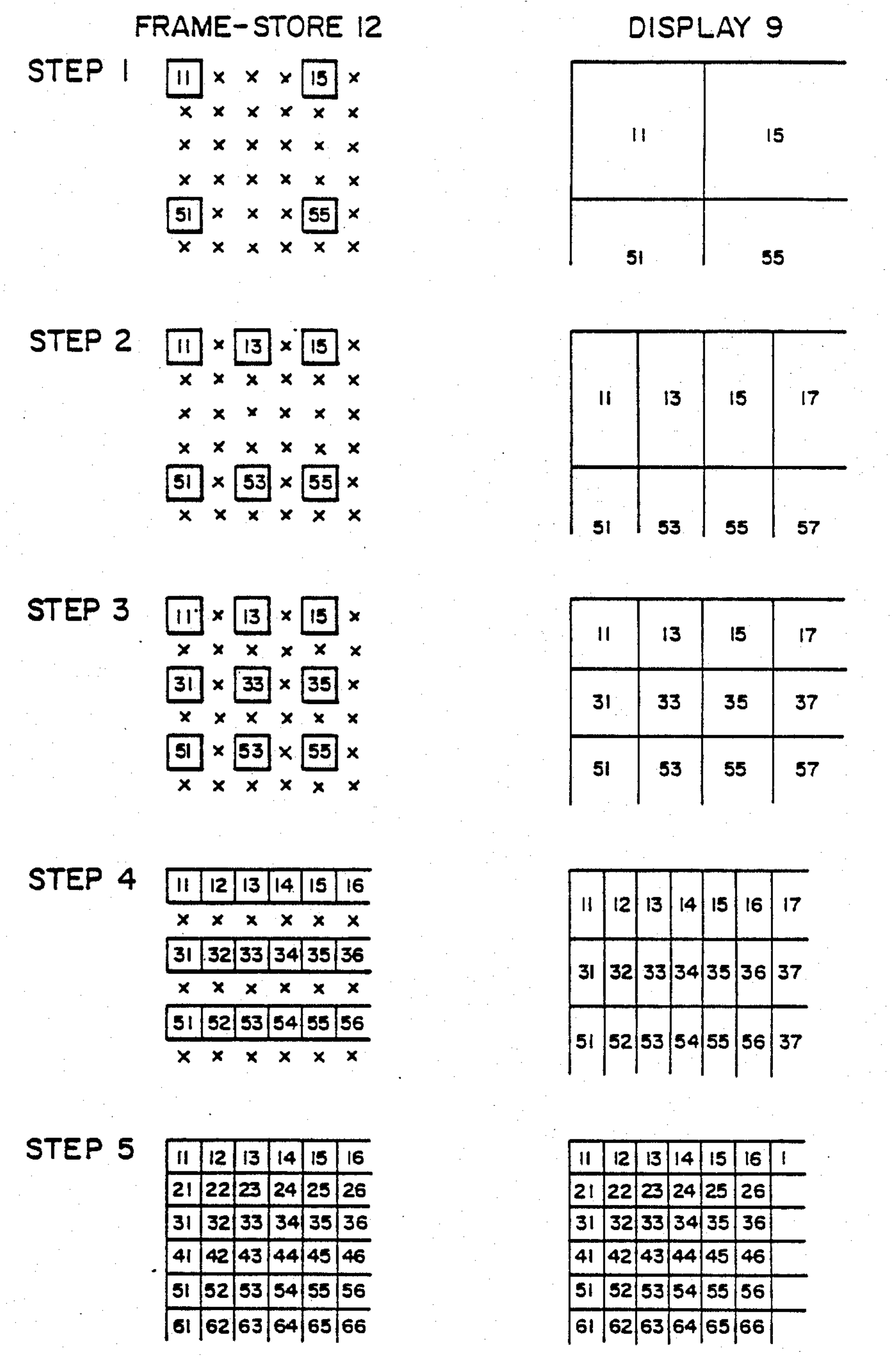

FIG. 5 illustrates five successive passes or steps in a second example of the method, where the sub-sample interval N=4. In this example, a block of 6×6 high resolution pixels in the image frame store 12 is considered, showing at each step of refinement (or pass) the corresponding display on the monitor 9. The modification sequence employed by the image processor 15 for each block 4×4 neighbouring pixels in this example is as follows:

| |
|---|
| 1 4 2 4 |
| 5 5 5 5 |
| 3 4 3 4 |
| 5 5 5 5 |

Although not forming part of the invention, the apparatus shown in FIG. 2 can also be used to achieve the conventional effects of scroll and horizontal zoom as will be described briefly below.

Scroll of an image is achieved by manipulating the X and Y addresses applied via registers 38 to the V-RAM memory 31. This would normally be performed by the host computer 1 in response to settings of a suitable interactive control means by the human operator. Vertical scroll of the image results from off-setting the line (Y) address by the desired amount. Horizontal scroll consists of two components, coarse and fine. Coarse horizontal scroll results from off-setting the column (X) address to the V-RAM. Because of the organisation of the V-RAM into four banks, however, each increment of coarse X-scroll results in a four-pixel horizontal shaft on the monitor. This effect is corrected by fine horizontal scroll, achieved by preloading a shift count, (range 0 to 3) into the shift register 32.

Horizontal zoom by integral multiples of pixels is achieved by replicating adjacent pixels in the sample register. For example, for two-times zoom each pixel from the V-RAM 31 must be duplicated at the video output. This is achieved by setting the clock-enable gate 34 to 1:8 ratio, so that the V-RAM 31 produces four adjacent pixels every eighth cycle of video clock 37. The clock-enable gates 35 and 36 are set to 1:2 ratio, passing one pixel from the shift register 32 to the sample gate 33 every second video data clock, and holding it for two clock cycles. Vertical zoom is achieved by controlling the Y addresses to the V-RAM through register 38.

We claim:

1. A method of interactively modifying an original image defined by original digital data representing the colour content of pixelsof said image at a first resolution, the method comprising (i) selecting a modification algorithm and a portion of said image to which said algorithm is to be applied;
(ii) modifying a first subset of pixels of said image portion in accordance with said selected algorithm to generate a modified image portion;
(iii) displaying said modified image portion on a monitor at a second, lower resolution under the control of said modified pixels; and,
(iv) repeating said steps (ii) and (iii) on further subsets of said first resolution pixels while the same image portion and algorithm are selected until all said first resolution pixels within said selected portion have been modified, wherein on each repeat of said steps (ii) and (iii) said modified image portion is displayed on said monitor at an increasingly higher resolution until it is displayed at said first resolution when all of said pixels of said selected image portion have been modified.

2. A method according to claim 1, wherein said step of selecting an image portion comprises viewing said image defined by the original digital data on said monitor.

3. A method according to claim 1, wherein said step (ii) is carried out within the frame rate of said monitor.

4. A method according to claim 1, wherein each iteration of said step (ii) is carried out while a modified image portion is being displayed on the monitor during the immediately preceding step (iii).

5. A method according to cliam 1, wherein the pixels in at least one of said subsets are regularly spaced throughout said image portion.

6. A method according to claim 5, wherein said original image is defined by a plurality of lines of pixels, and wherein said first subset of pixels is defined by alternate pixels on alternate lines of said original image.

7. Apparatus for interactively modifying an original image defined by original digital data representing the colour content of pixels of said image at a first resolution, said apparatus comprising a first store for storing said original digital data; a monitor; operator adjustable control means; and image processing means responsive to signals from said operator adjustable control means to select a modification algorithm and a portion of said image stored in said first store to which said algorithm is to be applied, said image processing means being further adapted to modify a subset of pixels of said image portion in accordance with said selected algorithm to generate a modified image portion and to cause said modified image portion to be displayed on said monitor at a second, lower resolution under the control of the modified pixels, and to continue to modify and display further subsets of said first resolution pixels while the same image portion and algorithm are selected until all said first resolution pixels within said selected portion have been modified, wherein the continued modifying and displaying causes said modified image portion to be displayed on said monitor at increasingly higher resolution until it is displayed at said first resolution when all of said pixels of said selected image porton have been modified.

8. Apparatus according to claim 7, wherein said image processing means comprises a processor for reading selected subsets of data from said first store and for modifying the selected data in accordance with the selected algorithm; a second store defining the colour content of monitor pixels on a one-to-one basis, said second store being loaded with modified data by said processor; and a video controller for controlling said monitor in response to said data in said second store.

9. Apparatus according to clam 7, wherein said image processing means comprises a processor for modifying selected subsets of data in said first store in accordance with the selected algorithm; and a video controller for reading data from said first store and for controlling said monitor in response to said read data.

* * * * *